US011110944B2

(12) United States Patent
Yanai et al.

(10) Patent No.: US 11,110,944 B2
(45) Date of Patent: Sep. 7, 2021

(54) VEHICLE CONTROL SYSTEM, TRAVEL MANAGEMENT DEVICE, RESOURCE MANAGEMENT DEVICE, VEHICLE CONTROL METHOD, AND PROGRAM

(71) Applicant: Mitsubishi Heavy Industries Engineering, Ltd., Kanagawa (JP)

(72) Inventors: Noritaka Yanai, Tokyo (JP); Masahiro Yamada, Tokyo (JP); Yutaka Miyajima, Tokyo (JP); Hiroki Nonaka, Tokyo (JP); Kazuyuki Wakasugi, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 188 days.

(21) Appl. No.: 15/778,331

(22) PCT Filed: Nov. 24, 2016

(86) PCT No.: PCT/JP2016/084735
§ 371 (c)(1),
(2) Date: May 23, 2018

(87) PCT Pub. No.: WO2017/090653
PCT Pub. Date: Jun. 1, 2017

(65) Prior Publication Data
US 2018/0346005 A1    Dec. 6, 2018

(30) Foreign Application Priority Data
Nov. 25, 2015  (JP) .............................. JP2015-230113

(51) Int. Cl.
B61L 27/00     (2006.01)
B61L 23/14     (2006.01)
(Continued)

(52) U.S. Cl.
CPC .......... B61L 27/0016 (2013.01); B60L 15/40 (2013.01); B61L 3/006 (2013.01); B61L 3/008 (2013.01);
(Continued)

(58) Field of Classification Search
CPC ...... B61L 27/0016; B61L 3/008; B61L 23/14; B61L 17/00; G06Q 10/02; B60L 15/40
See application file for complete search history.

(56) References Cited

U.S. PATENT DOCUMENTS 6,459,964 B1 *  10/2002  Vu ...................... B61L 27/0016
                                                        701/19
8,548,654 B2 *  10/2013  Katsuta ............... B61L 27/0038
                                                        246/177
(Continued)

FOREIGN PATENT DOCUMENTS

EP          2607199 A1 *  6/2013  .............. B61L 11/08
JP      2003-261028 A     9/2003
(Continued)

OTHER PUBLICATIONS

International Search Report in PCT/JP2016/084735, dated Feb. 28, 2017. 2pp.
Written Opinion in PCT/JP2016/084735, dated Feb. 28, 2017. 9pp.

Primary Examiner — Thomas G Black
Assistant Examiner — Tarek Elarabi
(74) Attorney, Agent, or Firm — Kanesaka Berner & Partners LLP

(57) ABSTRACT

A travel management device is configured to transmit a reservation request for a block section to be reserved based on track information indicating a plurality of block sections constituting a track on which a vehicle travels and a connection relationship between the block sections, the block section to be reserved being among the block sections included in the track on which the vehicle travels. A resource (Continued)

management device is configured to record the block section to be reserved indicated by the reservation request as a reserved block section of the vehicle which has transmitted the reservation request in case where the block section to be reserved indicated by the reservation request is not reserved by a vehicle other than the vehicle which has transmitted the reservation request at a time at which the reservation request is received.

14 Claims, 13 Drawing Sheets

(51) Int. Cl.
    *B61L 15/00*      (2006.01)
    *B61L 3/00*      (2006.01)
    *B60L 15/40*      (2006.01)
    *B61L 3/12*      (2006.01)
    *G06Q 10/02*      (2012.01)
    *G06Q 50/30*      (2012.01)

(52) U.S. Cl.
    CPC ............. *B61L 3/12* (2013.01); *B61L 15/0027* (2013.01); *B61L 15/0072* (2013.01); *B61L 23/14* (2013.01); *G06Q 10/02* (2013.01); *G06Q 50/30* (2013.01)

(56) References Cited

U.S. PATENT DOCUMENTS

| | | | |
|---|---|---|---|
| 8,958,396 B2* | 2/2015 | Ishihara | B60L 15/40 370/329 |
| 9,002,546 B2* | 4/2015 | Whitwam | B61L 21/10 701/19 |
| 2006/0074544 A1* | 4/2006 | Morariu | B61L 27/0027 701/117 |
| 2007/0162199 A1* | 7/2007 | Katsuta | B61L 27/0038 701/19 |
| 2012/0320875 A1* | 12/2012 | Ishihara | B60L 15/40 370/331 |
| 2012/0323411 A1* | 12/2012 | Whitwam | B61L 21/10 701/19 |

FOREIGN PATENT DOCUMENTS

| | | | | |
|---|---|---|---|---|
| JP | 2006-137337 A | 6/2006 | | |
| JP | 5049992 B2 | 10/2012 | | |
| JP | 2013-123963 A | 6/2013 | | |
| WO | WO-2013092113 A1 * | 6/2013 | ............. | B61L 11/08 |
| WO | WO-2014155731 A1 * | 10/2014 | .......... | B61L 27/0027 |

* cited by examiner

FIG. 5

| BLOCK SECTION LIST INFORMATION | | |
|---|---|---|
| BLOCK SECTION IDENTIFICATION INFORMATION | TRAVEL DISTANCE | |
| A1HT | ... | |
| A1WT-N | ... | |
| A1WT-R | ... | |
| A3WT-N | ... | |
| A3WT-R | ... | |
| 1T | ... | |
| | | |
| | | |

| BLOCK SECTION CONNECTION RELATION | |
|---|---|
| (1) | (2) |
| A1HT | A1WT-N |
| A1WT-N | A3WT-N |
| A1WT-N | A3WT-R |
| A1WT-R | A3WT-N |
| A3WT-N | 1T |
| | |
| | |

FIG. 7

| BLOCK SECTION IDENTIFICATION INFORMATION | BRANCH STATE | BRANCH REQUEST STATE | BOOKING PERSON IDENTIFICATION INFORMATION | MANAGEMENT STATE |
|---|---|---|---|---|
| A1HT | – | – | | |
| 2T | – | – | 0001 | RESERVATION COMPLETION |
| A1WT | N | R | 0001 | RESERVATION IN PROGRESS |
| A3WT | N | | | |

FIG. 11

| BLOCK SECTION IDENTIFICATION INFORMATION | RESOURCE MANAGEMENT DEVICE IDENTIFICATION INFORMATION |
|---|---|
| BLOCK | MANAGEMENT DEVICE |
| A1HT | #1 |
| A1WT | #1 |
| A3WT | #1 |
| 1T | #2 |
|  |  |
|  |  |

VEHICLE CONTROL SYSTEM, TRAVEL MANAGEMENT DEVICE, RESOURCE MANAGEMENT DEVICE, VEHICLE CONTROL METHOD, AND PROGRAM

RELATED APPLICATIONS

The present application is a National Phase of International Application No. PCT/JP2016/084735, filed on Nov. 24, 2016 and claims priority from Japanese Patent Application No. 2015-230113 filed Nov. 25, 2015.

TECHNICAL FIELD

The present disclosure relates to a vehicle control system, a travel management device, a resource management device, a vehicle control method, and a program.

Priority is claimed on Japanese Patent Application No. 2015-230113, filed Nov. 25, 2015, the content of which is incorporated herein by reference.

BACKGROUND ART

In a railway system that performs high-density operations, an automatic train protection (ATP) device for maintaining a safe speed of trains may be adopted. In a railway system adopting ATP, an interlocking device, the same as in the conventional art, is responsible for control of switching of points present at a track branch. The interlocking device performs exclusive control among vehicles in units on a course (block sections). The interlocking device controls the conversion of points while ensuring safety. An interlocking device and an ATP device are installed on a ground side in the railway system, but these devices are expensive and require provision of a large equipment room. The maintenance management of an interlocking device incurs costs because a signal engineer with special skills needs to create designed materials called an "interlocking chart."

A technology for simplifying ground facilities by an on-board device performing branch control mainly wirelessly as a unit for solving such problems is disclosed in Patent Literature 1.

CITATION LIST

Patent Literature

[Patent Literature 1]
Japanese Patent No. 5049992

SUMMARY

However, a technology of Patent Literature 1 described above is a technology which can be used only in "a linear (track) constituted by repetition of an identical linear pattern", and cannot be applied to a general urban railway having complicated linear alignments.

An object of the present invention herein is to provide a vehicle control system, a travel management device, a resource management device, a vehicle control method, and a program which can solve the above problems.

According to a first aspect of the present invention, a vehicle control system includes: a travel management device which includes a reservation request unit, the reservation request unit being configured to transmit a reservation request for a block section to be reserved based on track information indicating a plurality of block sections constituting a track on which a vehicle travels and a connection relationship between the block sections, the block section to be reserved being among the block sections included in the track on which the vehicle travels; and a resource management device which includes a reservation management unit, the reservation management unit being configured to record the block section to be reserved indicated by the reservation request as a reserved block section of the vehicle which has transmitted the reservation request in case where the block section to be reserved indicated by the reservation request is not reserved by a vehicle other than the vehicle which has transmitted the reservation request at a time at which the reservation request is received.

In addition, in the vehicle control system described above, the reservation management unit of the resource management device may be configured to transmit reservation completion information indicating the reserved block section of the vehicle which has transmitted the reservation request to the vehicle which is a transmission source of the reservation request, and the travel management device may include a speed calculation unit configured to calculate a speed limit pattern in each block section up to the block section indicated by the reservation completion information.

Moreover, in the vehicle control system described above, the vehicle may be mounted with the travel management device, the resource management device may be installed in each predetermined range in the track, and a reservation request unit of the travel management device may be configured to transmit, to the resource management device corresponding to a range including the block section to be reserved, the reservation request for the block section to be reserved.

Moreover, in the vehicle control system described above, the travel management device may include a passage information notification unit configured to transmit a passaged block section of the vehicle to the resource management device, and the reservation management unit of the resource management device may be configured to update information of the passed block section from a reserved block section to an unreserved block section in response to receiving the passed block section.

Moreover, in the vehicle control system described above, the travel management device may include a reservation abandonment unit configured to perform stop control of the vehicle in a case of acquiring a cancellation request for the reserved block section from a host device, the reservation abandonment unit being configured to transmit a reservation abandonment of an advance block section in a travel direction in the reserved block section to the resource management device after the vehicle stops.

Moreover, in the vehicle control system described above, the travel management device may be mounted on a vehicle.

Moreover, in the vehicle control system described above, the resource management device may be configured to store each block section included in a non-branch consecutive section in which a plurality of block sections without branches are continued, may be configured not to store information on whether each block section included in the non-branch consecutive section is reserved or unreserved, and may be configured to store a travel order of a vehicle traveling along the non-branch consecutive section, and the travel management device may be configured to acquire, after the vehicle mounted with the travel management device enters the non-branch consecutive section, identification information of an immediately preceding vehicle traveling immediately ahead of the vehicle from the resource management device, may be configured to detect a position of the immediately preceding vehicle by communicating with the immediately preceding vehicle, and may be configured to request braking control based on the position of the immediately preceding vehicle and a position of the vehicle mounted with the travel management device.

Moreover, in the vehicle control system described above, the travel management device may be configured to acquire reservation status information from the resource management device in advance in order to determine a block section to be reserved.

Moreover, in the vehicle control system, the resource management device may include a branch control unit configured to perform, in a case where a block section having a branch exists in the reserved block section of the vehicle, switching control for the branch based on a travel direction on the vehicle.

Moreover, in the vehicle control system described above, the travel management device may include a branch control unit configured to perform, in a case where a block section having a branch exists in the reserved block section of the vehicle, switching control for the branch based on a travel direction on the vehicle.

Moreover, in the vehicle control system described above, the travel management device may be configured to determine a travel start timing of a vehicle mounted with the travel management device based on a reservation time of a block section reserved by a vehicle other than the vehicle mounted with the travel management device.

In addition, according to a second aspect of the present invention, a travel control method is a travel control method for a vehicle control system including a travel management device and a resource management device, the travel management device transmits a reservation request for a block section to be reserved based on track information indicating a plurality of block sections constituting a track on which a vehicle travels and a connection relationship between the block sections, the block section to be reserved being among the block sections included in the track on which the vehicle travels, and the resource management device records the block section to be reserved indicated by the reservation request as a reserved block section of the vehicle which has transmitted the reservation request in case where the block section to be reserved indicated by the reservation request is not reserved by a vehicle other than the vehicle which has transmitted the reservation request at a time at which the reservation request is received.

In addition, according to a third aspect of the present invention, a travel management device includes: a reservation request unit configured to transmit a reservation request for a block section to be reserved based on track information indicating a plurality of block sections constituting a track on which a vehicle travels and a connection relationship between the block sections, the block section to be reserved being among the block sections included in the track on which the vehicle travels.

Moreover, according to a fourth aspect of the present invention, a resource management device is communicatively connected to a travel management device which includes a reservation request unit, the reservation request unit being configured to transmit a reservation request for a block section to be reserved based on track information indicating a plurality of block sections constituting a track on which a vehicle travels and a connection relationship between the block sections, the block section to be reserved being among the block sections included in the track on which the vehicle travels, and includes: a reservation management unit configured to record the block section to be reserved indicated by the reservation request as a reserved block section of the vehicle which has transmitted the reservation request in case where the block section to be reserved indicated by the reservation request is not reserved by a vehicle other than the vehicle which has transmitted the reservation request at a time at which the reservation request is received.

Moreover, according to a fifth aspect of the present invention, in a travel control method for a vehicle control system including a travel management device and a resource management device, the travel management device transmits a reservation request for a block section to be reserved based on track information indicating a plurality of block sections constituting a track on which a vehicle travels and a connection relationship between the block sections, the block section to be reserved being among the block sections included in the track on which the vehicle travels, and the resource management device records the block section to be reserved indicated by the reservation request as a reserved block section of the vehicle which has transmitted the reservation request in case where the block section to be reserved indicated by the reservation request is not reserved by a vehicle other than the vehicle which has transmitted the reservation request at a time at which the reservation request is received.

Moreover, according to a sixth aspect of the present invention, a program is for a computer of a travel management device in a vehicle control system including the travel management device and a resource management device, and causes the computer to execute: a reservation request procedure of determining a block section to be reserved based on track information indicating a plurality of block sections constituting a track on which a vehicle travels and a connection relationship between the block sections, the block section to be reserved being among the block sections included in the track on which the vehicle travels, and transmitting a reservation request for the block section to be reserved.

Furthermore, according to a seventh aspect of the present invention, a program is for a computer of a resource management device in a vehicle control system that includes a travel management device and the resource management device, the travel management device including a reservation request unit, the reservation request unit transmitting a reservation request for a block section to be reserved based on track information indicating a plurality of block sections constituting a track on which a vehicle travels and a connection relationship between the block sections, the block section to be reserved being among the block sections included in the track on which the vehicle travels, and causes the computer to execute: a resource management procedure of recording the block section to be reserved indicated by the reservation request as a reserved block section of the vehicle which has transmitted the reservation request in case where the block section to be reserved indicated by the reservation request is not reserved by a vehicle other than the vehicle which has transmitted the reservation request at a time at which the reservation request is received.

According to the present disclosure, it is possible to control travel of a vehicle traveling on a track without using an interlocking device or an ATP device.

BRIEF DESCRIPTION OF DRAWINGS

FIG. 5 is a diagram which shows track information stored by the travel management device.

FIG. 7 is a diagram which shows a reservation management table stored by the resource management device.

FIG. 11 is a diagram which shows resource management device information stored by a travel management device according to the second embodiment.

EMBODIMENTS FOR CARRYING OUT THE INVENTION

First Embodiment

Hereinafter, a vehicle control system according to a first embodiment of the present invention will be described with reference to the drawings.

Figure 1:
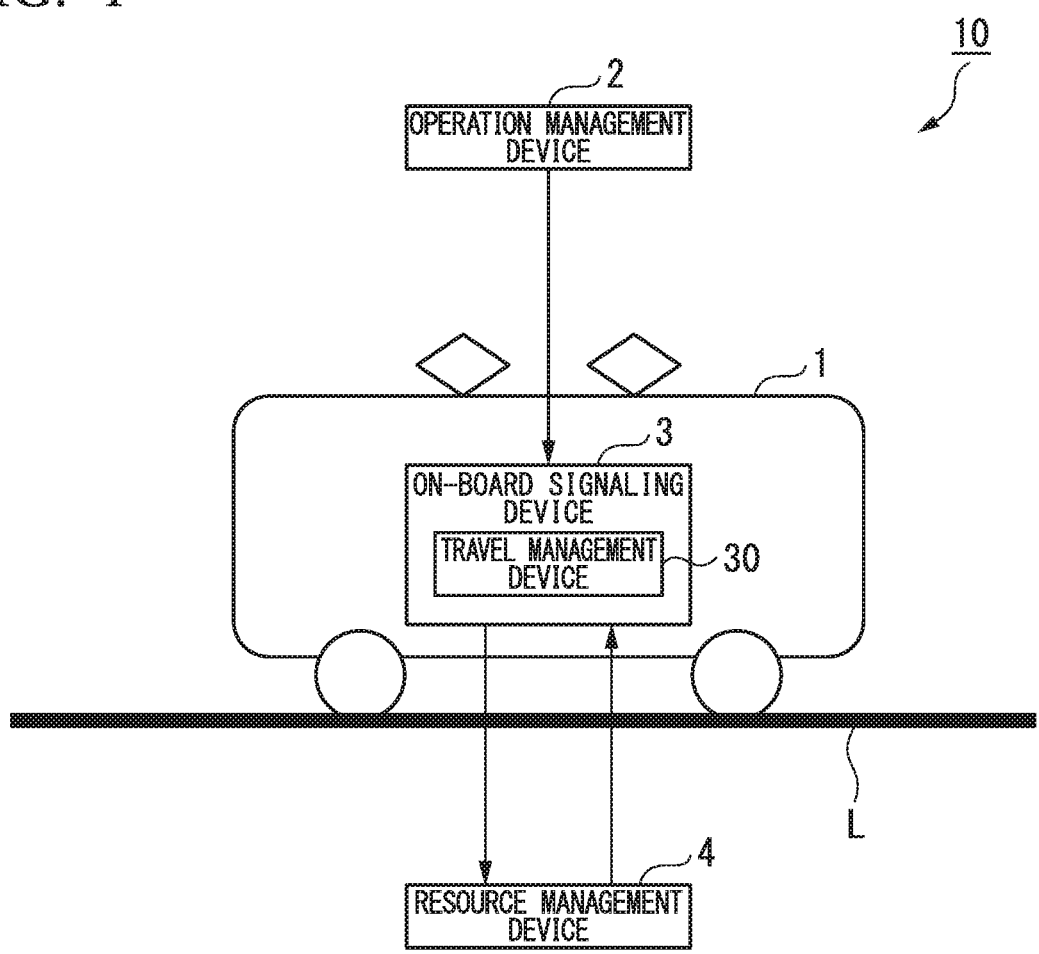
FIG. 1 is a diagram which shows a configuration of a vehicle control system according to a first embodiment of the present invention.

FIG. 1 is a diagram which shows a configuration of the vehicle control system according to the first embodiment of the present invention.

FIG. 1 shows a vehicle control system 10. The vehicle control system 10 includes an operation management device 2, an on-board signaling device 3 mounted on a vehicle 1, and a resource management device 4 as shown in FIG. 1. The operation management device 2 and the on-board signaling device 3 are connected by radio signals. The operation management device 2 outputs information for operation to the on-board signaling device 3. The on-board signaling device 3 includes a travel management device 30. The on-board signaling device 3 and the resource management device 4 are connected by radio signals. A vehicle travels on a track L. The track is constituted by a plurality of block sections. The travel management device 30 of the on-board signaling device 3 transmits or receives information to or from the resource management device 4 to perform reservation management for each block section which is a resource.

Describing in more detail, the travel management device 30 specifies a plurality of block sections included in a track on which the vehicle 1 travels on the basis of track information indicating a plurality of block sections constituting the track on which the vehicle 1 travels and a connection relationship between these block sections. The travel management device 30 determines a block section to be reserved which is positioned ahead of a block section on which a vehicle is currently present among the plurality of specified block sections. The travel management device 30 transmits a reservation request for this block section to be reserved to the resource management device 4.

The resource management device 4 determines whether the block section to be reserved which is indicated by the reservation request is reserved by vehicles other than a vehicle 1 which has transmitted the reservation request at a time at which this reservation request is received. The resource management device 4 records the block section to be reserved which is indicated by the reservation request as a reserved block section of the vehicle 1 which has transmitted the reservation request when the block section to be reserved is not reserved by vehicles other than the vehicle 1.

Figure 2:
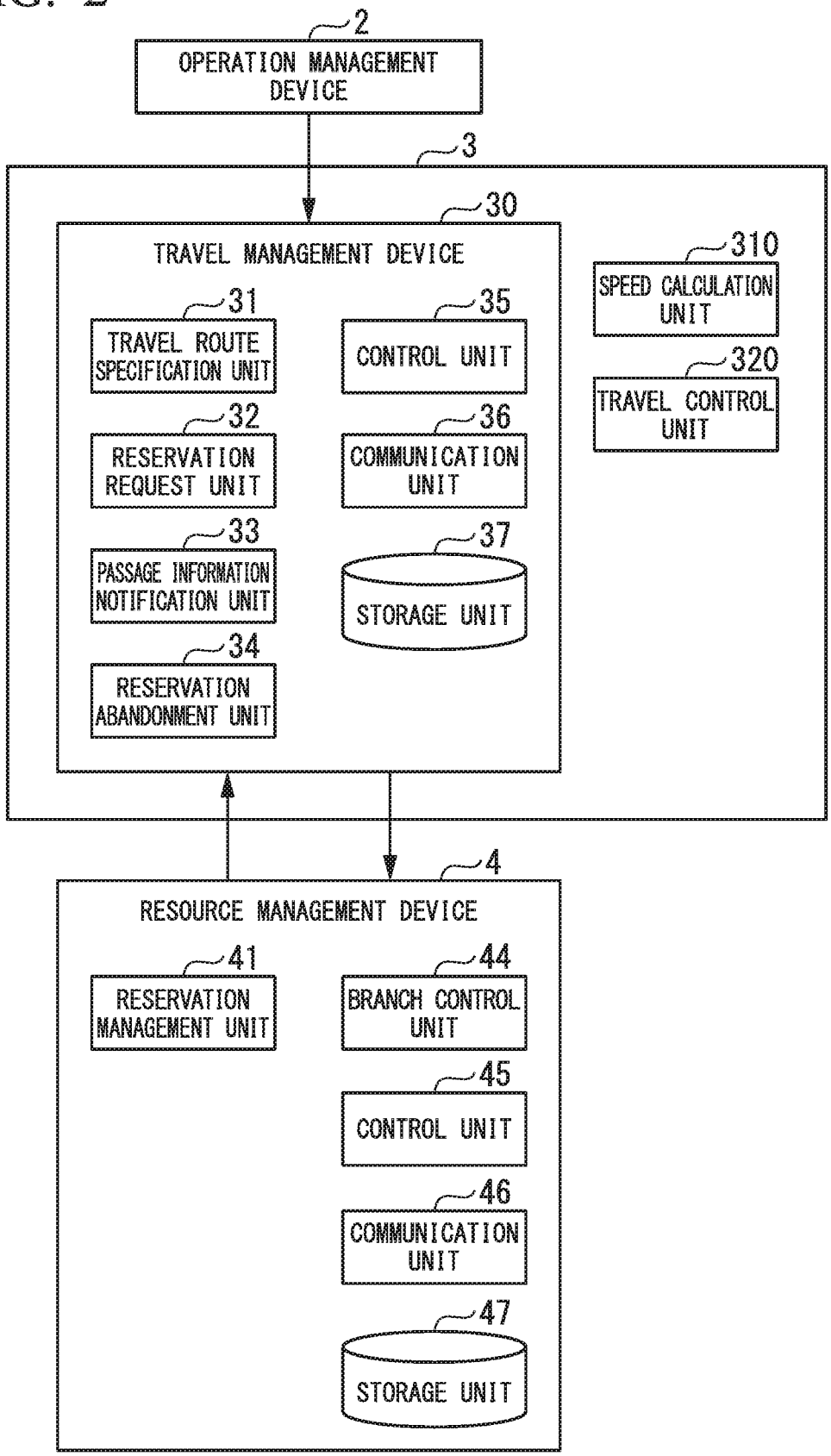
FIG. 2 is a functional block diagram of a travel management device and a resource management device according to the first embodiment of the present invention.

FIG. 2 is a functional block diagram of the on-board signaling device, the travel management device, and the resource management device according to the first embodiment of the present invention.

The on-board signaling device 3 includes a device allowing the functions of respective processing units including a speed calculation unit 310 and a travel control unit 320, in addition to the travel management device 30 to be exhibited therein.

The travel management device 30 includes respective processing units of a travel route specification unit 31, a reservation request unit 32, a passage information notification unit 33, a reservation abandonment unit 34, a control unit 35, and a communication unit 36, and a storage unit 37.

The resource management device 4 has respective processing units of a reservation management unit 41, a branch control unit 44, a control unit 45, and a communication unit 46, and a storage unit 47.

The travel route specification unit 31 of the travel management device 30 specifies a plurality of block sections included in a track on which a vehicle 1 travels on the basis of track information indicating a plurality of block sections and a connection relationship between these block sections.

The reservation request unit 32 determines a block section to be reserved positioned before a block section on which the vehicle 1 is currently present among the plurality of block sections specified by the travel route specification unit 31. The reservation request unit 32 transmits a reservation request for this block section to be reserved to the resource management device 4.

The reservation management unit 41 of the resource management device 4 determines whether a block section to be reserved which is indicated by the reservation request is reserved by vehicles other than the vehicle 1 which has transmitted the reservation request at a time when the reservation request is received. When the reservation management unit 41 determines that it is not reserved by vehicles other than the vehicle 1, the block section to be reserved indicated by the reservation request is recorded as a reserved block section of the vehicle 1 which has transmitted the reservation request.

The speed calculation unit 310 of the on-board signaling device 3 calculates a speed limit pattern in each block section up to a block section indicated by reservation completion information.

The travel control unit 320 of the on-board signaling device 3 performs stop control such as braking on the basis of speed limit patterns and a signal from a host device.

The passage information notification unit 33 of the travel management device 30 transmits a block section which a vehicle 1 has passed through to the resource management device 4.

The reservation abandonment unit 34 of the travel management device 30 performs stop control on a vehicle 1 when a cancellation request for a reserved block section is acquired by a host device. The reservation abandonment unit 34 transmits reservation abandonment of an advance block section in a travel direction among reserved block sections to the resource management device 4 in the reserved block section after the vehicle 1 stops.

The branch control unit 44 of the resource management device 4 performs switching control for a branch (points) based on a travel direction on a vehicle when there is a block section having a branch in reserved block sections of the vehicle.

The control unit 45 in the resource management device 4 controls respective processing units in the device. The communication unit 46 of the resource management device 4 communicates with the on-board signaling device 3. The storage unit 47 stores information for resource management.

Figure 3:
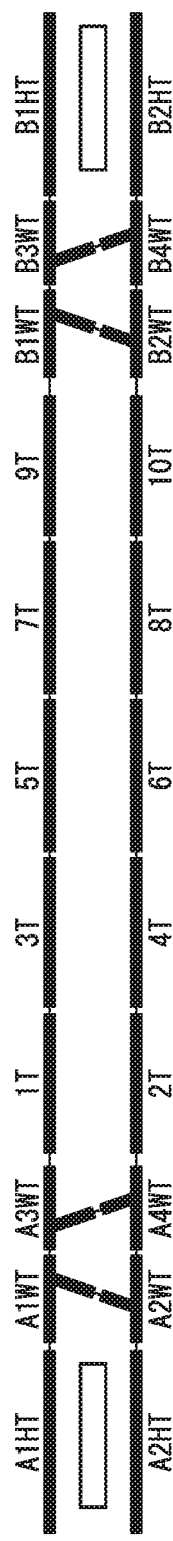
FIG. 3 shows respective block sections constituting a track on which a vehicle 1 travels.

FIG. 3 is a diagram which shows respective block sections constituting a track on which a vehicle travels.

A track on which the vehicle 1 travels is assumed to be a track constituted by respective block sections represented by identification information of A1HT, A2HT, A1WT, A2WT, A3WT, A4WT, 1T, 2T, 3T, 4T, 5T, 6T, 7T, 8T, 9T, 10T, B1WT, B2WT, B3WT, B4WT, B1HT, and B2HT. The eight block sections including A1WT, A2WT, A3WT, A4WT, B1WT, B2WT, B3WT, and B4WT have a branch. When a vehicle needs to travel along a block section having a branch in a state in which a point of the block section is set to a position on a normal position side, the identification information of this block section is indicated by adding "-N" thereto.

When a vehicle needs to travel along a block section having a branch in a state in which a point of the block section is set to a position on a reverse position side, the identification information of this block section is indicated by giving "-R" thereto. For example, when a point of the block section A1WT is controlled such that it is positioned on the normal position side and used by a vehicle 1, the identification information of this block section is represented as A1WT-N. When a point of the block section A1WT is controlled to be positioned on a reverse position side and used by a vehicle 1, the identification information of this block section is represented as A1WT-R.

Figure 4:
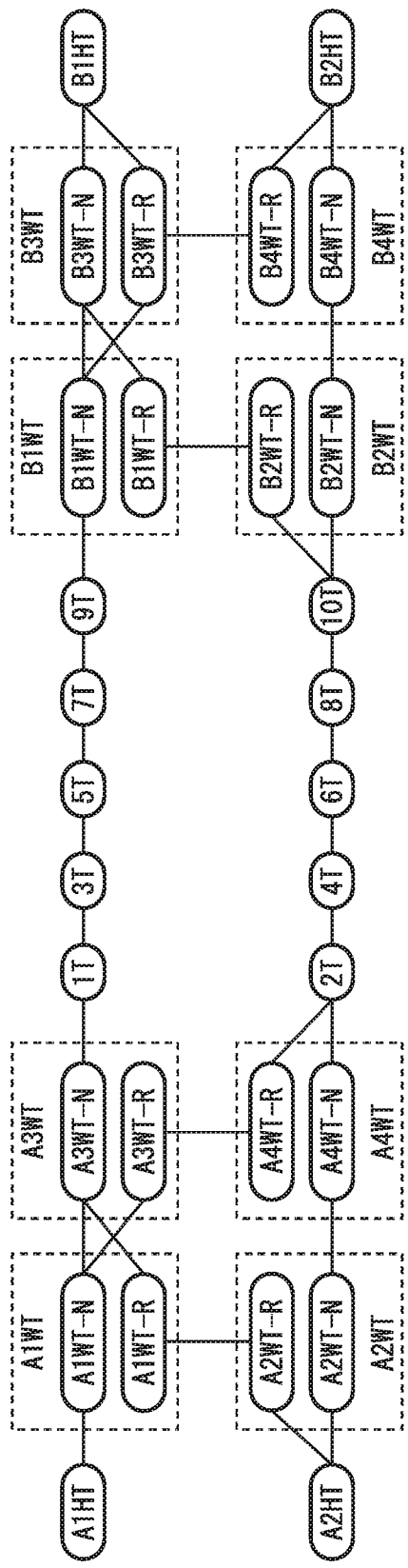
FIG. 4 is a diagram which shows a connection relationship between respective block sections constituting a track on which a vehicle 1 travels.

FIG. 4 is a diagram which shows connection relationships between respective block sections constituting a track on which the vehicle 1 travels.

If some of the connection relations shown in FIG. 4 are described, the block section A1WT-N has connection relationships with a block section A3WT-N and a block section A3WT-R. In addition, the block section A3WT-N has connection relations with the block section A1WT-N and the block section A1WT-R. In this manner, FIG. 4 shows an example in which block sections with a connection relation are connected by a straight line.

FIG. 5 is a diagram which shows track information stored by the travel management device.

The storage unit 37 of the travel management device 30 stores track information indicating respective pieces of identification information of a plurality of block sections constituting a track on which a vehicle 1 travels and connection relations of these block sections. One piece of the track information is block section list information. The block section list information includes respective identification information (block section names) of a plurality of block section constituting a track. Another piece of the track information is the connection relationship between block sections (refer to FIG. 4). In the information on the connection relationship between block sections, each combination of two block section having a connection relation is held for all block sections of a track on which a vehicle 1 travels.

Figure 6:
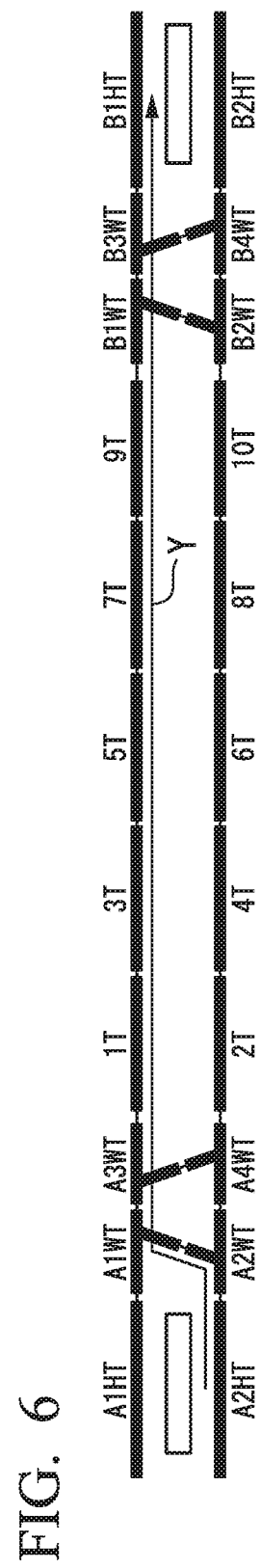
FIG. 6 is a diagram which shows a travel route of a vehicle.

FIG. 6 is a diagram which shows a travel route of a vehicle.

An arrow Y shown in FIG. 6 represents that a vehicle 1 travels along block sections indicated by the identification information of each of A2HT, A2WT-R, A1WT-R, A3WT-N, 1T, 3T, 5T, 7T, 9T, B1WT-N, B3WT-N, and B1HT in the track same as that of FIG. 3 in the order shown.

FIG. 7 is a diagram which shows a reservation management table stored by the resource management device.

The resource management device 4 creates a reservation management table 71, registers the table in the storage unit 47, and updates the content of this reservation management table 71. The reservation management table 71, as shown in FIG. 7, is a data table which holds at least respective pieces of information such as the identification information of a block section, a branch state, a branch request state, booking person identification information, and a management state in association with each other. The branch state is information for storing whether a point of a block section having a branch is set to the normal position side (-N) or set to the reverse position side (-R). Information "-" is set for a block section not having a branch in the branch state. The branch request state is information indicating a setting direction of the point of a block section having a branch among block sections that a vehicle desires to reserve. This setting direction may be designated in a reservation request by a vehicle side. The booking person identification information is information which stores the identification information of a reservation source (vehicle, command place, station, and the like) from which a reservation of a block section has been made. The management state is information indicating a current block section management state of a block section (indeterminate, reservation in progress, reservation-completed, presence on line, failure). "Indeterminate" in the management state indicates a status of not being reserved by a vehicle. The resource management device 4 mainly performs processing for updating information of this reservation management table 71. The resource management device 4 further stores data of track information indicating respective pieces of identification information of the block sections shown in FIG. 5 and connection relations of these block sections in the storage unit 47.

Figure 8:
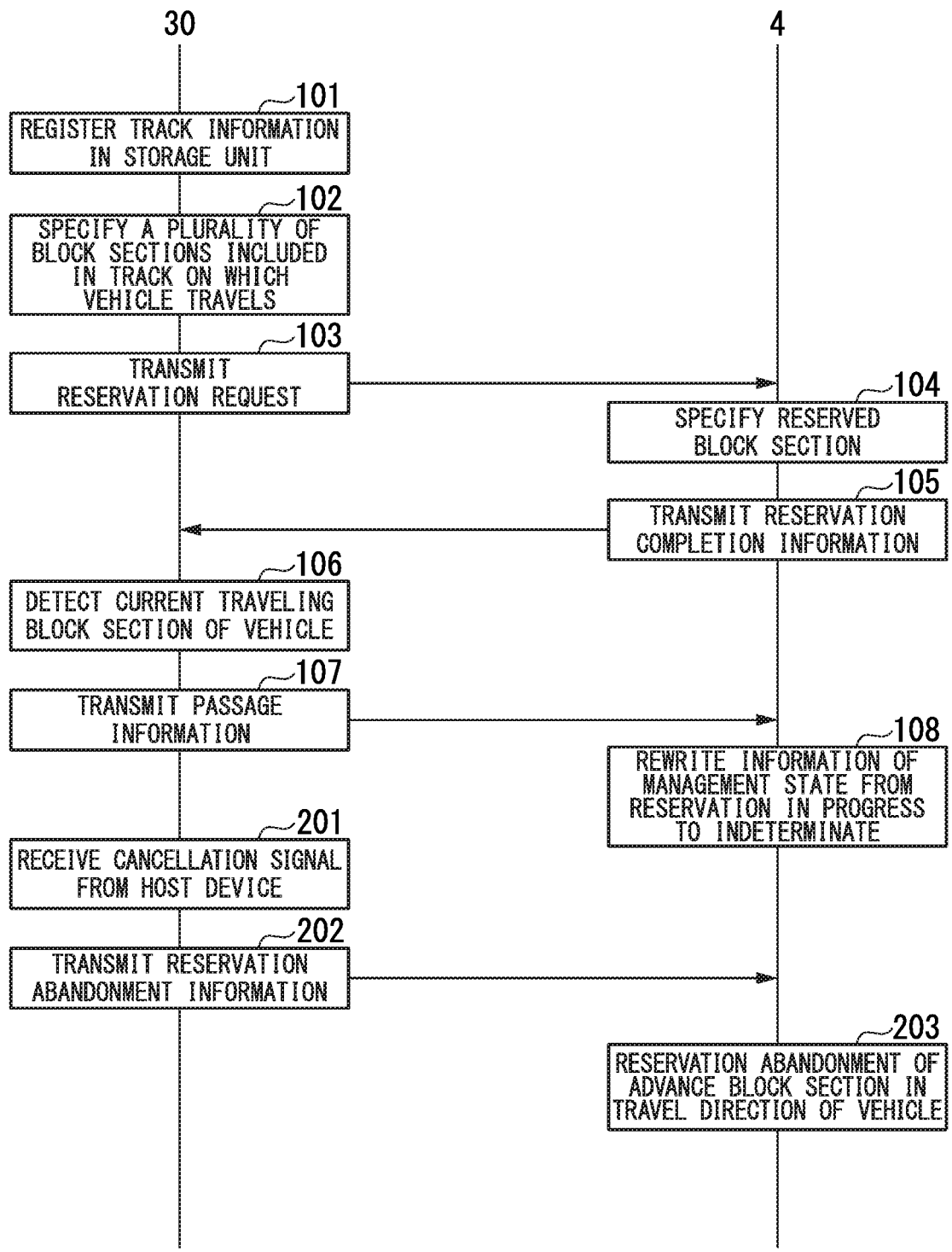
FIG. 8 is a diagram which shows a processing flow of the vehicle control system.

FIG. 8 is a diagram which shows a processing flow of the vehicle control system.

Next, the processing flow of the vehicle control system will be described.

In the vehicle control system 10, the operation management device 2 first transmits track information on a track on which the vehicle 1 travels to the on-board signaling device 3 mounted on the vehicle 1 via wireless communication. This track information may indicate respective block sections of a track on which a person in charge of command causes a vehicle 1 to travel. The on-board signaling device 3 outputs the track information to the travel management device 30. The communication unit 36 of the travel management device 30 acquires the track information. The control unit 35 registers the track information acquired by the communication unit 36 in the storage unit 37 (step S101).

In this step, the travel route specification unit 31 of the travel management device 30 reads the track information from the storage unit 37. The travel route specification unit 31 specifies a plurality of block sections included in a track on which a vehicle travels on the basis of the track information (step S102). The track information may be information including the identification information of block sections constituting a track on which it has been determined in advance that a vehicle will be caused to travel. Alternatively, the track information may be information including the identification information of block sections constituting each track of a plurality of routes which can be arbitrarily selected by a vehicle 1. The travel route specification unit 31 may specify block sections included in a track on a route specified using a predetermined route selection algorithm (a graph theory, a route searching technology, and the like) when a plurality of routes connecting a specific starting point to a specific ending point can be selected on the basis of the identification information of a plurality of block sections included in the track information. The travel route specification unit 31 outputs the specified block sections to the reservation request unit 32. The reservation request unit 32 specifies information of acquired block sections as information of block sections to be reserved. The reservation request unit 32 transmits a reservation request including the identification information of block sections to be reserved to the resource management device 4 via wireless communication (step S103). The reservation request may include information of a block section at which a vehicle 1 is currently positioned. The reservation request unit 32 determines whether block sections included in the reservation request have a branch in accordance with information which is recorded in the storage unit 37 and synchronized with a reservation management table, and stores a branch request state indicating whether a point needs setting to the normal position side (-N) or to the reverse position side (-R) in the reservation request when there is a branch.

The reservation management unit 41 of the resource management device 4 receives the reservation request. The reservation management unit 41 reads the identification information of block sections included in the reservation request. The reservation management unit 41 reads management state information for each of the read block sections from the reservation management table 71. The reservation management unit 41 specifies block sections whose management states are indeterminate among the block sections included in the reservation request. The reservation management unit 41 specifies identification information of a block section which is set in the identification information of the vehicle 1 as booking person identification information and has a management state of "presence on line" from the reservation management table 71. The reservation management unit 41 determines the identification information of this specified block section as a block section at which the vehicle 1 is currently positioned. The reservation management unit 41 specifies one or a plurality of block sections whose management states are indeterminate continuously from the block section at which the vehicle 1 is currently positioned as a reserved block section of a vehicle 1 among block sections whose management states are indeterminate out of the block sections included in the reservation request (step S104). The reservation management unit 41 records the identification information of the vehicle 1 in a column of the booking person identification information in the reservation management table, which corresponds to the identification information of a reserved block section of the vehicle 1. The reservation management unit 41 records reservation completion in a column of the management state in the reservation management table, which corresponds to the identification information of a reserved block section of the vehicle 1. The reservation management unit 41 reads table information (the branch state, the branch request state, the booking person identification information, and the management state), which is recorded in the reservation management table 71 in association with the identification information of respective block sections included in the reservation request, on the basis of the identification information. The reservation management unit 41 transmits reservation completion information including the read table information to a communication destination (the on-board signaling device 3 mounted on the vehicle 1) specified on the basis of the identification information of the vehicle 1 via wireless communication (step S105). The reservation management unit 41 may transmit information indicating a reservation failure to the specified communication destination on the basis of the identification information of the vehicle 1 when there is a block section which has a connection relation with a block section at which the vehicle 1 is present among the block sections included in the reservation request in a management state of any one of "reservation in progress," "reservation completion," "presence on line," and "failure."

The on-board signaling device 3 outputs reservation completion information to the travel management device 30 if the reservation completion information is received. The travel management device 30 records the reservation completion information in the storage unit 37. The reservation completion information may include table information of the reservation management table 71 (the branch state, the branch request state, the booking person identification information, and the management state). For this reason, the reservation completion information may include all information of block sections constituting a track on which the vehicle 1 travels in the reservation management table 71. The speed calculation unit 310 of the on-board signaling device 3 acquires a reserved (reservation-completed) block section of the vehicle 1 on the basis of reservation completion information recorded in the storage unit 37. The speed calculation unit 310 calculates a speed limit pattern in the reserved block section. There are various methods of calculating a speed limit pattern and there is no limitation thereto. For example, the speed calculation unit 310 may acquire a speed limit of each block section by communicating with the ATP device provided on a ground side alongside a track, and calculate a speed limit pattern in each block section (a speed limit value in each block section) on the basis of this speed limit. In addition, the speed calculation unit 310 may calculate a speed limit pattern in accordance with a distance to a furthest ahead reserved block section in a travel direction. The travel control unit 320 of the on-board signaling device 3 performs speed control on the vehicle 1 such that it does not exceed a speed limit pattern on the basis of the speed limit pattern. The speed calculation unit 310 may calculate a speed limit pattern using gradient information acquired from the ATP device. The speed calculation unit 310 may also calculate a speed limit pattern on the basis of information acquired from the operation management device 2 via wireless communication.

Figure 9:
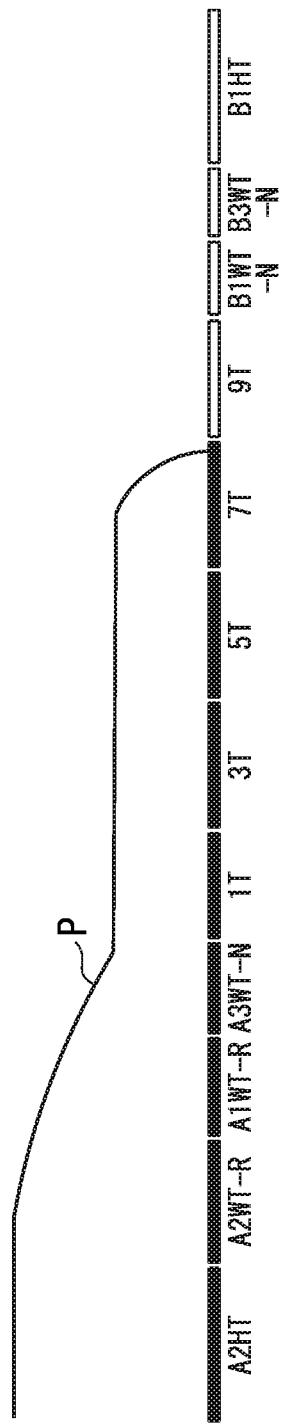
FIG. 9 is a diagram which shows a speed limit pattern and a reservation status.

FIG. 9 is a diagram which shows a speed limit pattern and a reservation status.

It is assumed that a vehicle 1 travels along A2HT, A2WT-R, A1WT-R, A3WT-N, 1T, 3T, 5T, 7T, 9T, B1WT-N, B3WT-N, and B1HT on the same track as in FIG. 3. FIG. 9 shows that each block section of A2HT, A2WT-R, A1WT-R, A3WT-N, 1T, 3T, 5T, and 7T is reservation-completed with respect to the vehicle 1 among block sections constituting the track indicated by this travel route. Reservation for each block section of 9T, B1WT-N, B3WT-N, and B1HT is indeterminate. In this case, the speed calculation unit 310 of the vehicle 1 calculates the speed limit pattern indicated by P in FIG. 9. In the drawing of FIG. 9, the vertical direction indicates a speed. Since reservation ahead of a speed block section 9T is not possible, FIG. 9 shows an example in which the speed limit pattern has a speed limit becoming zero in the middle of the block section 7T.

The passage information notification unit 33 detects a current traveling block section of a vehicle 1 (step S106). For example, the passage information notification unit 33 may acquire information of a block section acquired from the ATP device on the ground side by the on-board signaling device 3, and may also detect a current traveling block section of a vehicle 1 on the basis of a current position of the vehicle 1 obtained from a GPS. The passage information notification unit 33 repeats processing for specifying identification information of passed block sections on the basis of information of the current traveling block section of a vehicle. The passage information notification unit 33 transmits passage information including identification information of a newly passed block section and identification information of the vehicle 1 to the resource management device 4 (step S107). The reservation management unit 41 of the resource management device 4 acquires the identification information of a block section included in the passage information. The reservation management unit 41 rewrites the information of a management state recorded in the reservation management table as indeterminate in accordance with a combination of the identification information of a block section included in the passage information and the identification information of the vehicle 1 (step S108). The reservation management unit 41 reads table information recorded in the reservation management table 71 (the branch state, the branch request state, the booking person identification information, the management state, and so forth) in association with the identification information. The reservation management unit 41 transmits the read table information to a specified communication destination (the on-board signaling device 2 mounted on the vehicle 1) via wireless communication on the basis of the identification information of the vehicle 1.

The on-board signaling device 3 outputs the table information to the travel management device 30 if the table information is received. The travel management device 30 updates the storage unit 37 on the basis of the table information. The travel management device 30 may also cause information of the reservation management table of the vehicle 1 to be synchronized with the information stored by the resource management device 4.

The branch control unit 44 of the resource management device 4 may also control a direction of a point provided in a block section having a branch on the basis of the information of the reservation management table recorded in the storage unit 47. The branch control unit 44 specifies a block section having a branch among block sections for which it has been determined that the management states of the reservation management table 71 have been newly updated to reservation in progress. The branch control unit 44 compares a branch request state and a branch state of a block section having a branch among the block sections for which it has been determined that the management states are newly updated to reservation in progress. The branch control unit 44 transmits an instruction for changing the direction of a point of this block section to the point such that this branch state coincides with the branch request state when the branch state does not coincide with the branch request state. As a result, the direction of the point is changed. The branch control unit 44 updates the management state of this block section to reservation in progress from indeterminate after the branch state has been made to coincide with the branch request state of the block section having a branch among the block sections for which it has been determined that the management states are newly updated to reservation in progress.

The travel management device 30 may receive a cancellation signal of a reserved block section from a host device. The host device may be the operation management device 2, and may also be an emergency device installed in a station or a central control room. The travel management device 30 receives a cancellation signal from the host device (step S201). The travel management device 30 outputs a request for emergency braking to the travel control unit 320. The travel control unit 320 performs emergency or normal brake control and stops a vehicle 1. The reservation abandonment unit 34 transmits reservation abandonment information including identification information of a block section at which a vehicle 1 is positioned and the identification information of the vehicle 1 to the resource management device 4 via wireless communication (step S202). The reservation management unit 41 of the resource management device 4 acquires the identification information of the vehicle 1 and the identification information of a block section at which the vehicle 1 is currently positioned which are included in the reservation abandonment information. The reservation management unit 41 rewrites management states of other block sections other than a management state associated with the identification information of a block section at which the vehicle 1 is currently positioned among the management states recorded in the reservation management table 71 in association with the identification information of the vehicle 1 from reservation in progress to indeterminate (step S203). As a result, the resource management device 4 can process a reservation abandonment of an advance block section in a travel direction of the vehicle 1 based on the emergency braking of the vehicle 1.

Regarding the first embodiment of the present invention as has been described above, according to the processing described above, the vehicle control system 10 can control the management of a block section without requiring an interlocking device and the ATP device serving as ground equipment to perform processing of the management of a block section. That is, in the vehicle control system 10 described above, the resource management device 4 receives reservations of a block section in the order of vehicles whose reservation requests have made earlier in the reservation management of a block section. At this time, the resource management device manages reservations for each track independently without considering a relationship between tracks. Accordingly, since the resource management device 4 does not perform complicated logic processing and a logic design of an interlocking device requiring special skill is not necessary in maintenance of the vehicle control system 10, it is possible to construct a mechanism of vehicle control easily at low cost. At a time of locking control called an approach lock in a usual interlocking device, a time for compensating for a vehicle coming out of a specified block section is secured and, in the meantime, control is performed such that the block section is not reserved by another vehicle 1. However, since the position of a vehicle can be determined in the processing of the vehicle control system 10 described above, it is not necessary to perform processing for securing a time for compensating for such a vehicle coming out of a specified block section, and it is possible to promptly allow a reservation by another vehicle after cancellation of a course (reservation abandonment) of a vehicle.

Moreover, according to the processing described above, the vehicle control system 10 can manage a vehicle operation such as reservation control of block sections corresponding to an arbitrary travel route line.

Second Embodiment

Figure 10:
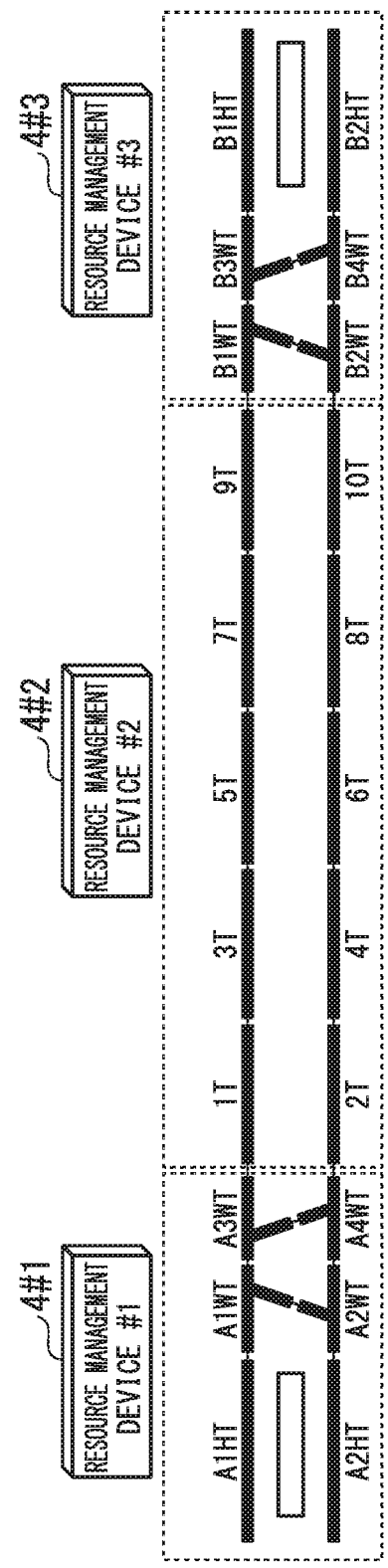
FIG. 10 is a diagram which shows an installation state of a resource management device according to a second embodiment.

FIG. 10 is a diagram which shows an installation state of a resource management device according to a second embodiment.

FIG. 11 is a diagram which shows resource management device information stored by a travel management device according to the second embodiment.

The first embodiment shows an example of a case in which the vehicle control system 10 has one resource management device 4. However, a plurality of resource management device 4 may be installed for each predetermined range in the track of a vehicle. In this case, the reservation request unit 32 of the travel management device 30 transmits a reservation request for a block section to be reserved to a resource management device 4 installed in a range including the block section to be reserved along which a vehicle mounted with the travel management device 30 currently travels among the plurality of resource management devices 4.

For example, as shown in FIG. 10, if description is provided using the track shown in FIG. 3, the reservation request unit 32 of the travel management device 30 transmits a reservation request to a first resource management device 4#1 when the vehicle mounted with the travel management device 30 is positioned at one of six block sections of A1HT, A2HT, A1WT, A2WT, A3WT, and A4WT.

In addition, the reservation request unit 32 transmits a reservation request to a second resource management device 4#2 when the vehicle mounted with the travel management device 30 is positioned at one of ten block sections of 1T, 2T, 3T, 4T, 5T, 6T, 7T, 8T, 9T, and 10T.

Moreover, the reservation request unit 32 transmits a reservation request to a third resource management device 4#3 when the vehicle mounted with the travel management device 30 is positioned at one of six block sections of B1WT, B2WT, B3WT, B4WT, B1HT, and B2HT.

The reservation request unit 32 specifies a resource management device 4 which is a transmission destination of a reservation request using resource management device information shown in FIG. 11. The resource management device information stores an association relationship between identification information of a block section and identification information of a resource management device.

When there are a plurality of resource management devices 4 installed in a range including a block section to be reserved, the reservation request unit 32 may transmit a reservation request for block sections in each range to these plurality of resource management devices 4.

According to the vehicle control system 10 of the second embodiment, since the travel management device 30 can make a reservation of a block section by communicating with a resource management device installed at a position relatively close to the position of a vehicle mounted with the travel management device 30, it is possible to improve a processing speed for reserving a block section, and as a result, the travel management device 30 can advance a calculation timing of a speed limit pattern. In addition, since each resource management device 4 only needs to manage information of block sections positioned in a range allocated to a corresponding resource management device 4, it is possible to reduce an amount of processing of each resource management device 4 respectively and to achieve a reduction in size. In addition, since a resource management device 4 can be installed close to a branch, the degree of freedom regarding disposition in an equipment room increases, and wiring to a branch device is also made easy.

Third Embodiment

Figure 12:
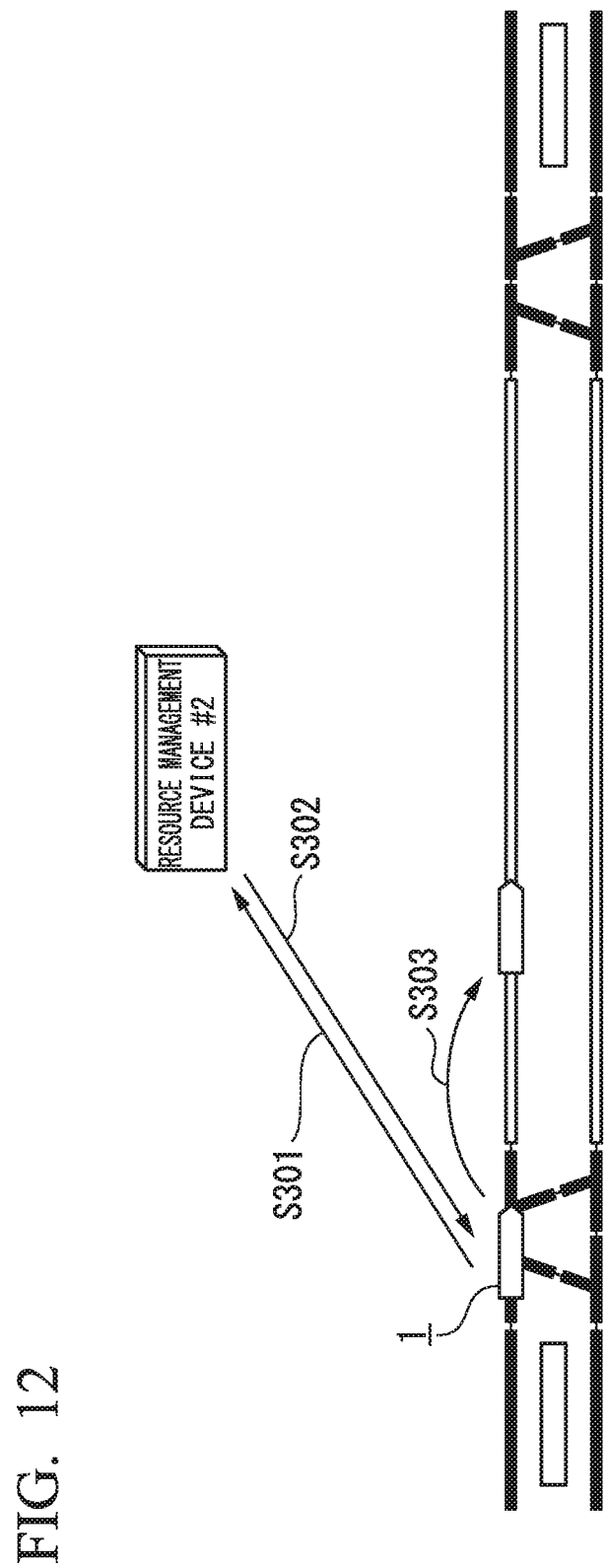
FIG. 12 is a diagram which shows a processing outline according to a third embodiment.

FIG. 12 is a diagram which shows a processing outline according to a third embodiment.

The resource management device 4 stores each block section included in a non-branch consecutive section in which a plurality of block sections without a branch are continued in the reservation management table 71, and may also store only a travel order of a vehicle traveling along the non-branch consecutive section without storing information on whether each block section included in this non-branch consecutive section is reserved or unreserved.

In this case, the reservation management table 71 holds identification information of a non-branch consecutive section in addition to the information of FIG. 7. Block sections which do not correspond to the identification information of a non-branch consecutive section are block sections which are not included in the non-branch consecutive section. In addition, in the case of the third embodiment, the resource management device 4 and the travel management device 30 store a travel order table. The travel order table holds the identification information of a non-branch consecutive section and order information of respective vehicles positioning in the non-branch consecutive section. The resource management device 4 acquires identification information of a block section at which a vehicle 1 is positioned from the travel management device 30 periodically (at predetermined time intervals) (step S301). The reservation management unit 41 of the resource management device 4 compares the acquired identification information of a block section with the identification information of a non-branch consecutive section, thereby determining whether the block section at which a vehicle 1 is positioned is in a non-branch consecutive section. The travel management device 30 may determine whether the block section at which a vehicle 1 is positioned is in a non-branch consecutive section on the basis of the position of a vehicle 1 mounted with the travel management device 30.

The reservation management unit 41 records the identification information of a vehicle 1, the identification information of a non-branch consecutive section, and the travel order of a vehicle 1 among vehicles traveling in this non-branch consecutive section in a travel order table when it is determined that the block section at which the vehicle 1 is positioned is in a non-branch consecutive section. The reservation management unit 41 of the resource management device 4 transmits information of the travel order table to the travel management device 30 of the vehicle 1 (step S302). As a result, the travel management device 30 may store the information of the travel order table. The travel management device 30 can detect a vehicle mounted with the travel management device 30 entering a non-branch consecutive section when it is determined that identification information of the vehicle mounted with the travel management device 30 is recorded in the travel order table on the basis of a periodic check.

In a case of the third embodiment, the travel management device 30, after a vehicle mounted with the travel management device 30 enters a non-branch consecutive section, acquires the identification information of an immediately preceding vehicle traveling immediately ahead of the vehicle (step S303). Specifically, the travel management device 30 acquires a non-branch consecutive section and a travel order in which a vehicle mounted with the travel management device 30 travels from the travel order table recorded in the storage unit 37. The travel management device 30 acquires the identification information of another vehicle recorded in a travel order table in which information of a previous travel order to the travel order of a vehicle mounted with the travel management device 30 and the identification information of the same non-branch consecutive section are combined and associated. The acquired identification information of another vehicle is the identification information of a vehicle traveling immediately ahead of the vehicle mounted with the travel management device 30. The travel management device 30 acquires the identification information of a vehicle traveling immediately ahead and communication destination information from the storage unit 37 and communicates with the vehicle traveling immediately ahead. The travel management device 30 inquires about a position, a speed, and the like of the vehicle traveling immediately ahead on the basis of communication with an immediately preceding vehicle. If the position, speed, and the like of the vehicle traveling immediately ahead are acquired, the travel management device 30 outputs the position, the speed, and the like to the speed calculation unit 310 and requests for braking control. The speed calculation unit 310 calculates a speed limit pattern by further using information such as the position, the speed, and the like of a vehicle traveling immediately ahead. When a position at which a vehicle 1 travels is beyond a non-branch consecutive section, the travel management device 30 may notify the resource management device 4 of this. Whether a position at which the vehicle 1 travels is beyond a non-branch consecutive section may be determined by the resource management device 4 on the basis of information and the like of a block section at which the vehicle 1 is positioned.

According to the processing of the third embodiment, since vehicles positioning in a non-branch consecutive section communicate with each other, and perform braking control, block section reservation management of the resource management device 4 in this section is unnecessary, and an amount of processing of the resource management device 4 can be reduced. In addition, since the braking control of vehicles can be performed by communication between the vehicles positioning in the non-branch consecutive section, it is not necessary to communicate using a remote resource management device 4, and time required for communication is eliminated. As a result, it is possible to improve vehicle density in a predetermined section of a traveling vehicle and to improve transportation capacity.

Fourth Embodiment

The travel route specification unit 31 of the travel management device 30 may determine a block section to be reserved using information of a reservation status acquired from the resource management device 4 in advance. Specifically, the travel route specification unit 31 of the travel management device 30 detects identification information of a block section which is not reserved (indeterminate) from track information. The travel route specification unit 31 specifies a track constituted by block sections which are not reserved among tracks for a plurality of arbitrarily selectable routes, and determines each block section included in this track as a reservation target.

Fifth Embodiment

The travel management device 30 may further include a branch control unit, and may perform the same processing as the processing of the branch control unit 44 of the resource management device 4. That is, when there is a block section having a branch in the reserved block sections of a vehicle 1, the branch control unit of the travel management device 30 may transmit a switching instruction for a point of the branch based on a travel direction of the vehicle 1 to this point.

Sixth Embodiment

The travel management device 30 may also determine a travel start timing of a vehicle mounted with the travel management device 30 on the basis of a reservation time of a block section which is reserved by vehicles other than the vehicle 1 mounted with the travel management device 30. In this case, the reservation time is further held in association with the identification information of each block section in the reservation management table 71 generated by the resource management device 4. The travel management device 30 determines whether a predetermined number or more of pieces of information of reservation in progress for new vehicle identification information have been registered in the reservation management table 71 between a current time and a predetermined time ago. The travel management device 30 determines that there are many vehicles departing at the same time when a predetermined number or more of pieces of information of reservation in progress for new vehicle identification information have been registered in the reservation management table 71 between a current time and a predetermined time ago. In this case, the travel management device 30 may determine to delay a travel start of a host vehicle which is stopped by a predetermined time. By performing such control of a travel start timing, a vehicle control system can prevent an abnormal load of electric power.

Seventh Embodiment

Figure 13:
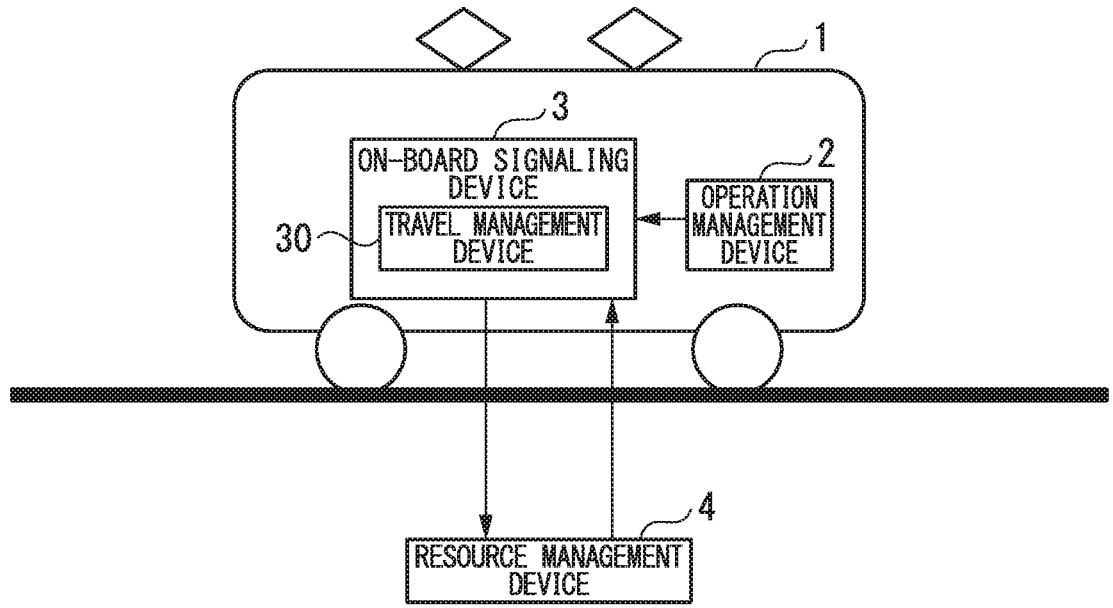
FIG. 13 is a diagram which shows a vehicle control system according to a seventh embodiment.

FIG. 13 is a diagram which shows a vehicle control system according to a seventh embodiment of the present invention.

In the vehicle control system, as shown in FIG. 13, the vehicle 1 may be mounted with each of the operation management device 2 and the on-board signaling device 3 including the travel management device 30. The processing flow between respective devices in processing in this case is the same as in the first to sixth embodiments.

Eighth Embodiment

Figure 14:
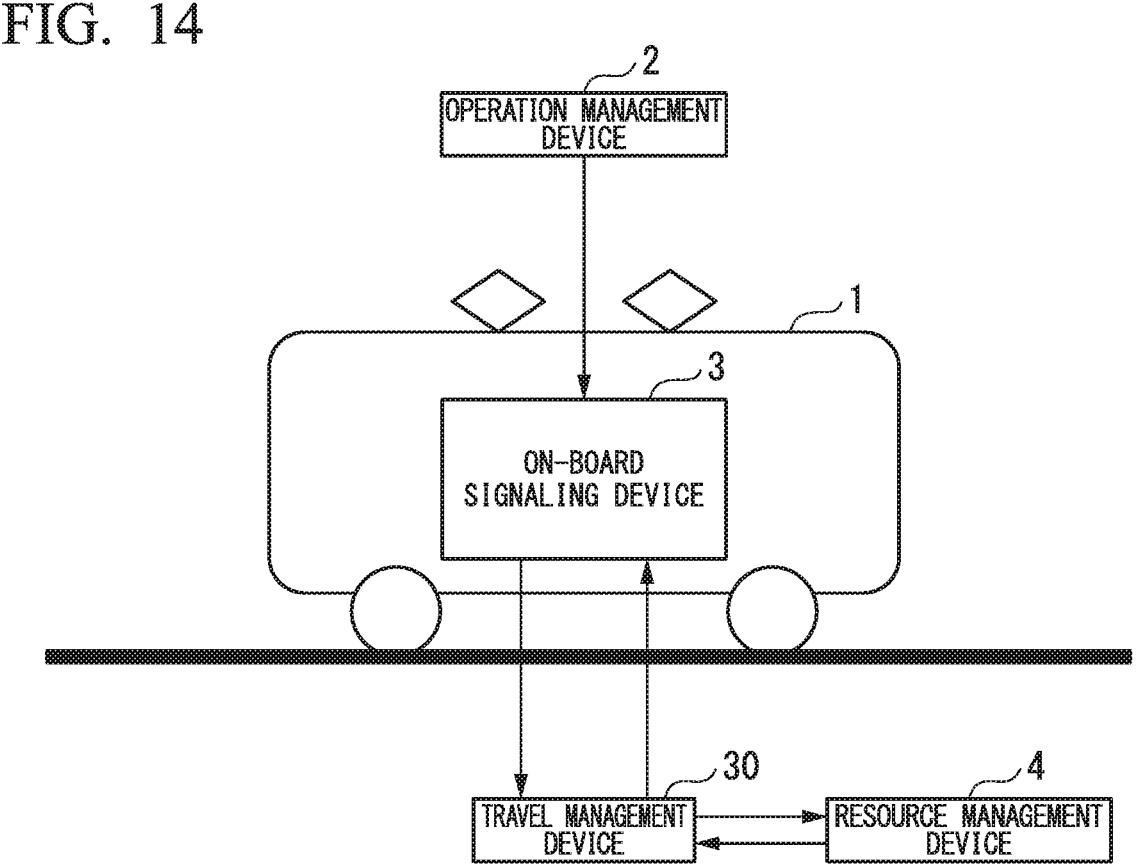
FIG. 14 is a diagram which shows a vehicle control system according to an eighth embodiment.

FIG. 14 is a diagram which shows a vehicle control system according to an eighth embodiment of the present invention.

In the vehicle control system, as shown in FIG. 14, the travel management device 30 may be installed outside of a vehicle. In this case, even if wireless communication is needed between the on-board signaling device 3 and the travel management device 30, information flows between the operation management device 2, the on-board signaling device 3, the travel management device 30, and the resource management device 4 are the same as each other. Respective device components constituting the vehicle control system of the eighth embodiment may be applied to each embodiment except for the third embodiment.

The on-board signaling device 3, the travel management device 30, and the resource management device 4 described above each have a computer system therein. Processes of each processing described above are stored in a computer-readable recording medium in a form of program, and the processing is performed by a computer reading and executing this program. Here, the computer-readable recording medium refers to a magnetic disk, a magneto-optical disc, a CD-ROM, a DVD-ROM, a semiconductor memory, or the like. In addition, this computer program may be distributed to a computer by communication lines, and the computer which receives this distribution may execute this program.

The program described above may be a program which realizes some of functions described above. The program described above may also be a so-called difference file (a difference program) which can realize the functions described above by being combined with a program which is already recorded in a computer system.

INDUSTRIAL APPLICABILITY

The present disclosure may be applied to a vehicle control system, a travel management device, a resource management device, a vehicle control method, and a program.

REFERENCE SIGNS LIST

1 Vehicle
2 Operation management device
3 On-board signaling device
4 Resource management device
30 Travel management device

The invention claimed is:

1. A vehicle control system configured to control a vehicle to run along a track including a plurality of block sections including branching block sections and non-branching block sections, comprising:
 an onboard signaling device mounted on the vehicle and configured to control the vehicle to run according to track information for associating each of the plurality of block sections with a corresponding identification;
 a travel management device configured to transmit a reservation request to indicate reserved block sections existing ahead of the vehicle to run along the track according to the track information, wherein when the reservation request includes a branching block section, the branching block section indicates whether a branch is positioned in either a normal position or a reverse position; and
 a resource management device disposed outside of the vehicle and configured to record the reserved block section indicated by the reservation request with a reservation management table, wherein the reservation management table is configured to record an association between an identification of the vehicle and an identification of the reserved block section as well as a management state for each block section and a branched state for each branching block section, and wherein the reservation management table is configured to change the management state of the reserved block section from a non-reserved state to a reserved state when the reserved block section indicated by the reservation request is not reserved by another vehicle at a time of receiving the reservation request, thus sending reservation-completion information to the onboard signaling device, which is configured to calculate a limit speed pattern for reserved block sections reserved by the vehicle based on the reservation-completion information and to control the vehicle not to exceed the limit speed pattern.

2. The vehicle control system according to claim 1, wherein the travel management device is installed in the onboard signaling device, wherein the resource management device is located in a predetermined range of the track, and wherein the travel management device is configured to transmit the reservation request to the resource management device located in the predetermined range of the track including the reserved block sections, indicated by the reservation request.

3. The vehicle control system according to claim 1, wherein the travel management device is configured to notify the resource management device of a passaged block section having its identification which the vehicle has already passed through, and wherein the resource management device is configured to update the reservation management table to release the passed block section by changing its management state from the reserved state to the non-reserved state.

4. The vehicle control system according to claim 1, wherein, the travel management device is configured to perform stop control of the vehicle upon acquiring from a host device a cancellation request for cancelling a certain range of reserved block sections existing ahead of the vehicle and to thereby transmit a reservation abandonment for abandoning reservation with respect to the certain range of reserved block sections to the resource management device after the vehicle stops.

5. The vehicle control system according to claim 1, wherein the travel management device is installed in the onboard signaling device, wherein the resource management device is configured to store a range of the track solely including the non-branching block sections continuously connected together among the plurality of block sections without storing reservation or non-reservation with respect to each of the non-branching block sections and to thereby store a travel order for the vehicle to travel along the range of the track solely including the non-branching block sections, and the travel management device is configured to acquire, after the vehicle mounted with the travel management device enters the range of the track solely including the non-branching block sections, identification information of an immediately preceding vehicle traveling immediately ahead of the vehicle from the resource management device, to detect a position of the immediately preceding vehicle via communication with the immediately preceding vehicle, and to thereby request braking control based on the position of the immediately preceding vehicle and a position of the vehicle according to the travel order.

6. The vehicle control system according to claim 1, wherein the travel management device is configured to acquire the reservation status from the resource management device in advance in order to determine the reserved block section.

7. The vehicle control system according to claim 1, wherein the resource management device is configured to perform, when the reserved block section is the branching block section, switching control for the branching block section according to a travel direction of the vehicle.

8. The vehicle control system according to claim 1, wherein the travel management device is configured to perform, when the reserved block section is the branching block section, switching control for the branching block section according to a travel direction of the vehicle.

9. The vehicle control system according to claim 1, wherein the reservation management table is configured to record a reservation time for reservation of the reserved block section, and
wherein the travel management device is mounted on the vehicle and configured to determine a travel start timing of the vehicle not to overlap the reservation time of another vehicle having already reserved the reserved block section indicated by the reservation request.

10. A travel management device interlocked with an onboard signaling device mounted on a vehicle and configured to carry out a travel control over the vehicle, comprising:
transmitting a reservation request to indicate reserved block sections existing ahead of the vehicle to run along a track according to track information for associating each of a plurality of block sections, including branching block sections and non-branching block sections, with a corresponding identification, wherein when the reservation request includes a branching block section, the branching block section indicates whether a branch is positioned in either a normal position or a reverse position, thus causing the onboard signaling device to carry out;
calculating a speed limit pattern for the vehicle to run through a range of reserved block sections according to reservation completion information which is sent from a resource management device when the reserved block section indicated by the reservation request is not reserved by another vehicle at a time of transmitting the reservation request.

11. A resource management device disposed outside of a vehicle to run along a track including a plurality of block sections including branching block sections and non-branching block sections, comprising:
receiving from a travel management device installed in an onboard signaling device mounted on the vehicle a reservation request to indicate reserved block sections existing ahead of the vehicle to run along the track according to track information for associating each of the plurality of block sections with a corresponding identification, wherein when the reservation request includes a branching block section, the branching block section indicates whether a branch is positioned in either a normal position or a reverse position;
recording the reserved block sections indicated by the reservation request with a reservation management table, wherein the reservation management table is configured to record an association between an identification of the vehicle and an identification of the reserved block section as well as a management state for each block section and a branched state for each branching block section, and wherein the reservation management table is configured to change the management state of the reserved block section from a non-reserved state to a reserved state when the reserved block section indicated by the reservation request is not reserved by another vehicle at a time of receiving the reservation request; and
transmitting reservation-completion information to the onboard signaling device, causing the onboard signaling device to limit speed of the vehicle not to exceed a limit speed pattern for the reserved block sections of the vehicle calculated based on the reservation-completion information.

12. A travel control method for controlling a vehicle to run along a track including a plurality of block sections including branching block sections and non-branching block sections via communication between a travel management device interlocked with an onboard signaling device mounted on the vehicle and configured to carry out travel control over the vehicle and a resource management device disposed outside of the vehicle, comprising:
transmitting by the travel management device a reservation request to indicate reserved block sections existing ahead of the vehicle to run along the track according to track information for associating each of the plurality of block sections with a corresponding identification, wherein when the reservation request includes a branching block section, the branching block section indicates whether a branch is positioned in either a normal position or a reverse position; and
recording by the resource management device the reserved block section indicated by the reservation request with a reservation management table, which is configured to record an association between an identification of the vehicle and an identification of the reserved block section as well as a management state for each block section and a branched state for each branching block section, wherein the reservation management table is configured to change the management state of the reserved block section from a non-reserved state to a reserved state when the reserved block section indicated by the reservation request is not reserved by another vehicle at a time of receiving the reservation request; and
transmitting reservation-completion information to the onboard signaling device, causing the onboard signaling device to calculate a limit speed pattern for the reserved block sections reserved by the vehicle according to the reservation-completion information and to limit speed of the vehicle not to exceed the limit speed pattern.

13. A non-transitory computer-readable recording medium storing a program for causing a computer of a travel management device to manage a vehicle to run along a track including a plurality of block sections including branching block sections and non-branching block sections upon interlocked with an onboard signaling device mounted on the vehicle and configured to carryout travel control over the vehicle in communication with a resource management device disposed outside of the vehicle, implementing:
a reservation request procedure to transmit a reservation request to indicate reserved block sections existing ahead of the vehicle to run along the track according to track information for associating each of the plurality of block sections with a corresponding identification, wherein when the reservation request includes a branching block section, the branching block section indicates whether a branch is positioned in either a normal position or a reverse position, thus causing the onboard signaling device to carry out a speed calculation procedure to calculate a speed limit pattern for the vehicle to run through a range of reserved block sections according to reservation completion information which is sent from the resource management device when the reserved block section is not reserved by another vehicle at a time of transmitting the reservation request.

14. A non-transitory computer-readable recording medium storing a program for causing a computer of a resource management device disposed outside of a vehicle to communicate with a travel management device interlocked with an onboard signaling device mounted on the vehicle and configured to carry out travel control over the vehicle and configured to manage the vehicle to run along a track including a plurality of block sections including branching block sections and non-branching block sections and to transmit a reservation request to indicate reserved block sections existing ahead of the vehicle to run along the track, wherein when the reservation request includes a branching block section, the branching block section indicates whether a branch is positioned in either a normal position or a reverse position, implementing:

a resource management procedure to record the reserved block section indicated by the reservation request with a reservation management table which is configured to record an association between an identification of the vehicle and an identification of the reserved block section as well as a management state for each block section and a branched state for each branching block section, wherein the reservation management table is configured to change the management state of the reserved block section from a non-reserved state to a reserved state when the reserved block section indicated by the reservation request is not reserved by another vehicle at a time of receiving the reservation request, transmitting reservation-completion information to the onboard signaling device and causing the onboard signaling device to calculate a limit speed pattern of the vehicle to run in a range of reserved block sections according to the reservation-completion information.

* * * * *